US012641569B2

(12) United States Patent
Li

(10) Patent No.: US 12,641,569 B2
(45) Date of Patent: May 26, 2026

(54) WIRELESS COMMUNICATION METHODS

(71) Applicant: BEIJING XIAOMI MOBILE SOFTWARE CO., LTD., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 478 days.

(21) Appl. No.: 18/031,474

(22) PCT Filed: Oct. 13, 2020

(86) PCT No.: PCT/CN2020/120687
§ 371 (c)(1),
(2) Date: Apr. 12, 2023

(87) PCT Pub. No.: WO2022/077232
PCT Pub. Date: Apr. 21, 2022

(65) Prior Publication Data
US 2023/0379872 A1        Nov. 23, 2023

(51) Int. Cl.
*H04W 8/24*        (2009.01)
*H04W 68/00*        (2009.01)
(52) U.S. Cl.
CPC ................................. *H04W 68/005* (2013.01)
(58) Field of Classification Search
None
See application file for complete search history.

(56) References Cited

U.S. PATENT DOCUMENTS

2013/0227576 A1    8/2013   Liu
2019/0159168 A1*   5/2019   Wang ..................... H04W 68/02

FOREIGN PATENT DOCUMENTS

CN        103167533 A        6/2013
CN        106028273 A    * 10/2016    .............. H04W 4/00
CN        110598870 A      12/2019
CN        110990870 A        4/2020
WO     WO-2018107368 A1 *  6/2018    .............. H04W 8/24

OTHER PUBLICATIONS

PCT/CN2020/120687, English translation of Search Report dated Jul. 13, 2021, 2 pages.
LG Electronics "FS_AMMT-Compressed Federated Learning" 3GPP TSG-SA WG1 Meeting #91e, S1-203188, Aug.-Sep. 2020, 5 pages.
European Patent Application No. 20957013.4, Search and Opinion dated Jun. 10, 2024, 11 pages.

* cited by examiner

*Primary Examiner* — Gary Lafontant
(74) *Attorney, Agent, or Firm* — Cozen O'Connor

(57)        ABSTRACT

A method for wireless communication performed by a user equipment (UE) includes: the UE in a non-connection state reporting first auxiliary information, in which the first auxiliary information is used for a network side to determine a UE for executing a task. A method for wireless communication performed by a base station includes: receiving first auxiliary information reported by a UE in a non-connected state, in which the first auxiliary information is configured for a network to determine a UE for performing a task.

14 Claims, 6 Drawing Sheets

UE network

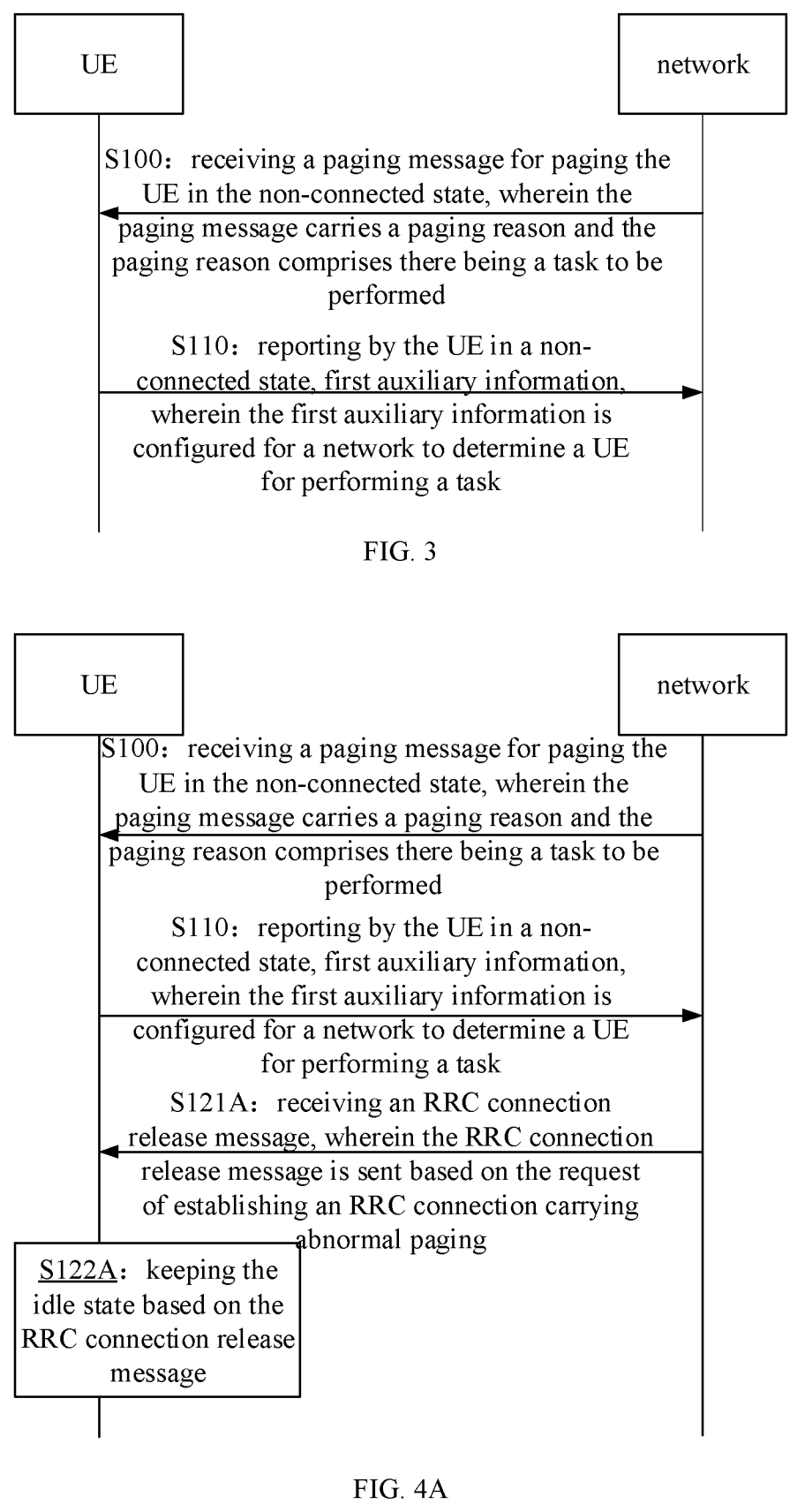

S100: receiving a paging message for paging the UE in the non-connected state, wherein the paging message carries a paging reason and the paging reason comprises there being a task to be performed S110: reporting by the UE in a non-connected state, first auxiliary information, wherein the first auxiliary information is configured for a network to determine a UE for performing a task

FIG. 3

UE network

S100: receiving a paging message for paging the UE in the non-connected state, wherein the paging message carries a paging reason and the paging reason comprises there being a task to be performed S110: reporting by the UE in a non-connected state, first auxiliary information, wherein the first auxiliary information is configured for a network to determine a UE for performing a task S121A: receiving an RRC connection release message, wherein the RRC connection release message is sent based on the request of establishing an RRC connection carrying abnormal paging S122A: keeping the idle state based on the RRC connection release message

FIG. 4A

| UE | | network |
|---|---|---|

S100: receiving a paging message for paging the UE in the non-connected state, wherein the paging message carries a paging reason and the paging reason comprises there being a task to be performed S110: reporting by the UE in a non-connected state, first auxiliary information, wherein the first auxiliary information is configured for a network to determine a UE for performing a task S121B: receiving an RRC resume response message S122B: in response to the RRC resume response message being sent based on the RRC resume request carrying abnormal paging, keeping the inactive state

FIG. 4B

| UE | | network |
|---|---|---|

S210: receiving first auxiliary information reported by a UE in a non-connected state, wherein the first auxiliary information is configured for a network to determine a UE for performing a task

FIG. 5

WIRELESS COMMUNICATION METHODS

CROSS-REFERENCE TO RELATED APPLICATION

This application is the U.S. national phase application of International Application No. PCT/CN2020/120687, filed on Oct. 13, 2020, the entire disclosure of which is incorporated herein by reference.

TECHNICAL FIELD

The disclosure relates to, but is not limited to a field of wireless communication technologies, and particularly to a method and an apparatus for wireless communication, a communication device and a storage medium.

BACKGROUND

In some cases, a network needs a user equipment (UE) to assist in performing some tasks, or needs multiple UEs to jointly perform tasks.

However, the related art does not provide a technical solution on how a network element may select a suitable UE to perform a task, and there are various problems in the related art caused by inappropriate selection of a UE to perform a task.

SUMMARY

According to a first aspect of the disclosure, a method for wireless communication is performed by a user equipment (UE). The method includes: reporting by the UE in a non-connected state, first auxiliary information. The first auxiliary information is configured for a network to determine a UE for performing a task.

According to a second aspect of the disclosure, a method for wireless communication is performed by a base station. The method includes: receiving first auxiliary information reported by a user equipment (UE) in a non-connected state. The first auxiliary information is configured for a network to determine a UE for performing a task.

According to a third aspect of the embodiments of the disclosure, a method for wireless communication is provided. The method includes: sending a paging message, in which a paging reason of the paging message includes: there being a task to be performed.

It should be understood that both the foregoing general description and the following detailed description are exemplary and explanatory only, which are not intended to limit the embodiments of the disclosure.

BRIEF DESCRIPTION OF THE DRAWINGS

The accompanying drawings, which are incorporated in and constitute a part of this specification, illustrate embodiments consistent with the disclosure and together with the specification serve to explain principles of the embodiments of the disclosure.

FIG. 3 is a schematic flowchart illustrating a method for wireless communication according to an exemplary embodiment.

FIG. 4A is a schematic flowchart illustrating a method for wireless communication according to an exemplary embodiment.

FIG. 4B is a schematic flowchart illustrating a method for wireless communication according to an exemplary embodiment.

FIG. 5 is a schematic flowchart illustrating a method for wireless communication applied to a base station, according to an exemplary embodiment.

DETAILED DESCRIPTION

Exemplary embodiments will be described in detail herein, examples of which are illustrated in the accompanying drawings. Where the following description refers to the drawings, the same numerals in different drawings refer to the same or similar elements unless otherwise indicated. The implementations described in the following exemplary embodiments do not represent all implementations consistent with the embodiments of the disclosure. Rather, they are merely examples of apparatuses and methods consistent with some aspects of the embodiments of the disclosure, as recited in the appended claims.

Terms used in the embodiments of the disclosure are for the purpose of describing specific embodiments only, and are not intended to limit the embodiments of the disclosure. As used in the examples of the disclosure and the appended claims, the singular forms "a", "an" and "the" are also intended to include the plural forms unless the context clearly dictates otherwise. It should also be understood that the term "and/or" as used herein refers to and includes any and all possible combinations of one or more of the associated listed items.

It should be understood that although the embodiments of the disclosure may use the terms first, second, third, etc. to describe various information, the information should not be limited to these terms. These terms are only used to distinguish information of the same type from one another. For example, without departing from the scope of the embodiments of the disclosure, first information may also be called second information, and similarly, the second information may also be called the first information. Depending on the context, the word "if" as used herein may be interpreted as "in case that" or "when" or "in response to determining"

Figure 1:
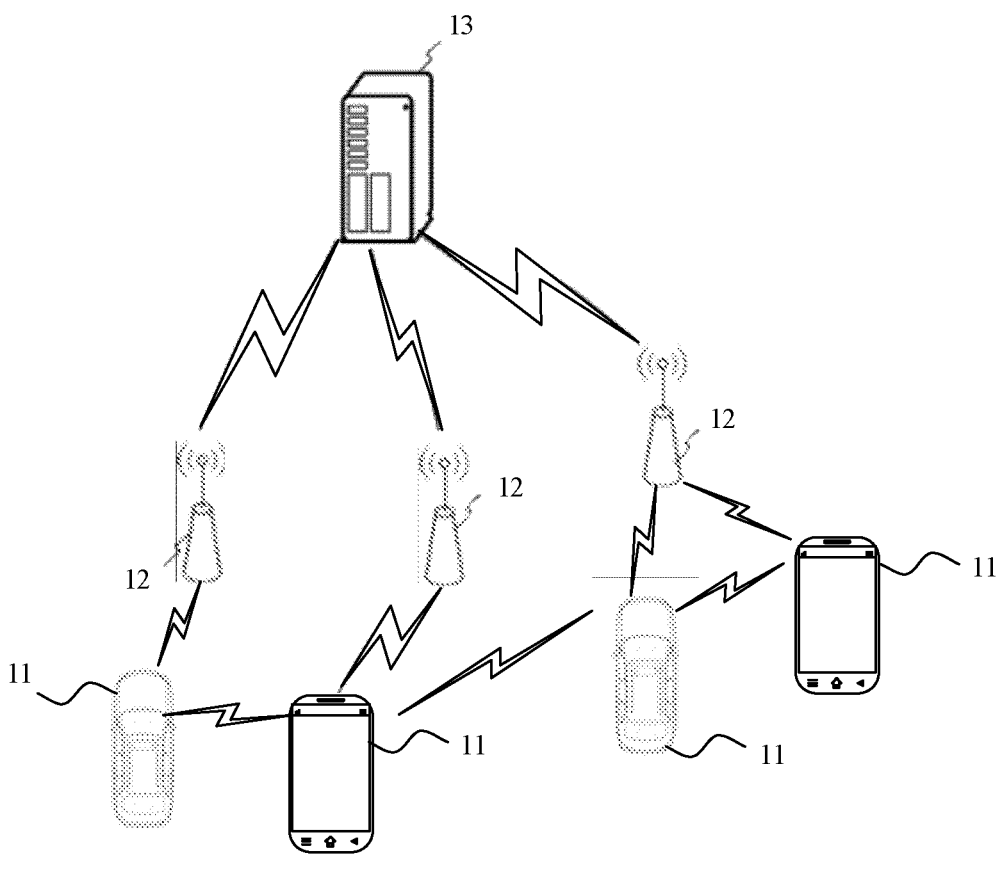
FIG. 1 is a structural schematic diagram illustrating a wireless communication system according to an exemplary embodiment.

Referring to FIG. 1, it shows a structural schematic diagram of a wireless communication system according to an embodiment of the disclosure. As shown in FIG. 1, the wireless communication system is a communication system based on cellular mobile communication technology, and the wireless communication system may include: several UEs 11 and several base stations 12.

UE 11 may be a device that provides voice and/or data connectivity to a user. UE 11 may communicate with one or more core networks via a radio access network (RAN), and UE 11 may be an Internet of Things (IoT) UE, such as a sensor device, a mobile phone (or called a "cellular" phone) and a computer with the IoT-UE. For example, UE 11 may be a fixed, portable, pocket, hand-held, built-in or vehicle-mounted device. For example, UE 11 may be a station (STA), a subscriber unit, a subscriber station, a mobile station, a mobile, a remote station, an access point, a remote terminal, an access terminal, a user terminal, a user agent, a user device, or user equipment (UE). Alternatively, UE 11 may also be a device of an unmanned aerial vehicle. Alternatively, UE 11 may also be a vehicle-mounted device, for example, it may be an electronic control unit (ECU) with a wireless communication function, or a wireless communication device connected externally to the ECU. Alternatively, the UE 11 may also be a roadside device, for example, it may be a street lamp, a signal lamp, or other roadside devices with a wireless communication function.

The base station 12 may be a network-side device in a wireless communication system. The wireless communication system may be the 4th generation mobile communication (4G) system, also known as a long term evolution (LTE) system. Alternatively, the wireless communication system may also be a 5G system, also known as new radio (NR) system or 5G NR system. Alternatively, the wireless communication system may also be a next-generation system of the 5G system. The access network in the 5G system may be called a new generation-radio access network (NG-RAN). Alternatively, it is a machine-type communication (MTC) system.

The base station 12 may be an evolved base station (eNB) used in the 4G system. Alternatively, the base station 12 may also be a base station (gNB) that adopts a centralized distributed architecture in a 5G system. When the base station 12 adopts the centralized distributed architecture, it usually includes a central unit (CU) and at least two distributed units (DUs). The CU is provided with protocol stacks of a packet data convergence protocol (PDCP) layer, a radio link control (RLC) protocol layer, and a medium access control (MAC) layer. The DU is provided with a protocol stack of a physical (PHY) layer. The specific implementation of the base station 12 is not limited in this embodiment of the disclosure.

A wireless connection may be established between the base station 12 and the UE 11 through a wireless air interface. In different embodiments, the wireless air interface is a wireless air interface based on the fourth generation mobile communication network technology (4G) standard or a wireless air interface based on the fifth generation mobile communication network technology (5G) standard. For example, the wireless air interface is a new air interface. Alternatively, the wireless air interface may also be a wireless air interface based on a 5G next-generation mobile communication network technology standard.

In some embodiments, an end-to-end (E2E) connection may also be established between the UEs 11, for example, vehicle-to-vehicle (V2V) communication, vehicle to infrastructure (V2I) communication and vehicle to pedestrian (V2P) communication and other communication scenes in vehicle-to-everything (V2X) communication.

In some embodiments, the above wireless communication system may further include a network management device 13.

Several base stations 12 are respectively connected to the network management device 13. The network management device 13 may be a core network device in a wireless communication system. For example, the network management device 13 may be a mobility management entity (MME) in an evolved packet core (EPC). Alternatively, the network management device may also be other core network devices, such as a serving gateway (SGW), a public data network gateway (PGW), a policy and charging rules function (PCRF) or a home subscriber server (HSS), etc. The implementation of the network management device 13 is not limited in this embodiment of the disclosure.

Federated learning has great potential for commercial applications, but there are also major challenges. A communication link between participants, such as a smartphone and a central aggregation server may be slow or unstable. Theoretically, any terminal may participate in the federated learning, but insufficient local computing power (such as memory shortage) of some terminals and locating in a scenario with poor communication links may cause a model to generate deviations, resulting in a training failure of the entire federated model. This situation may inevitably make the entire system unstable and unpredictable. Therefore, it is necessary to consider the selection of terminals participating in the federated learning to avoid training failure of the entire federated learning system. This disclosure provides a user selection way to participate in the federated learning.

Figure 2:
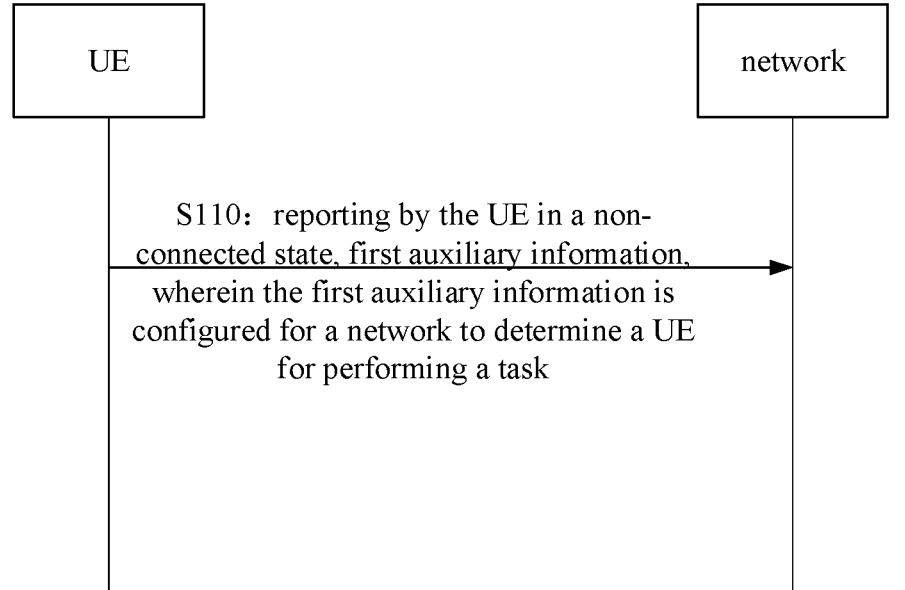
FIG. 2 is a schematic flowchart illustrating a method for wireless communication applied to a user equipment (UE), according to an exemplary embodiment.

As shown in FIG. 2, an embodiment of the disclosure provides a method for wireless communication, which is applied to a user equipment (UE). The method includes the following step at S110.

At S110, the UE in a non-connected state reports first auxiliary information, where the first auxiliary information is configured for a network to determine a UE for performing a task.

The UE may be various types of UEs, for example, a mobile terminal such as a mobile phone, a tablet computer, or a wearable device, or may also be a smart device, a vehicle-mounted device or an IoT device.

The smart device includes but not limited to: a smart office device and/or a smart home device.

The non-connected state includes: an idle state and an inactive state.

The UE in an inactive state may report the first auxiliary information through a paging response or a random access message. The first auxiliary information here may not be reported through a radio resource control (RRC) connection between the UE and the base station. Instead, a reporting method (such as the paging response or the random access message) may be used to report the first auxiliary information without establishing an RRC connection.

The task here may be a task of various forms that the network needs to assign to the UE for execution. For example, the task includes but is not limited to: a federated learning task, a neural network training task, a machine learning task and/or a distributed computing task.

The federated learning is an emerging artificial intelligence based technology, which was first proposed by Google in 2016 with an original purpose of solving a problem of updating models locally for terminal users of Android phones. The design goal of federated learning is to carry out efficient machine learning among multiple participants or computing nodes under the premise of ensuring information security during the exchange of big data, protecting the privacy of terminal data and personal data and ensuring compliance with laws and regulations. The machine learning algorithms that may be used in federated learning are not limited to neural networks, but also include important algorithms such as random forests. Federated learning is expected to be a basis for next-generation artificial intelligence collaborative algorithms and collaborative networks.

The neural network training task may include any neural network training task that is not related to the federated learning task, for example, a supervised learning task, an unsupervised learning task and/or a semi-supervised learning task.

The first auxiliary information may be used by the network to determine whether to select the UE to perform a task to be performed. For example, the first auxiliary information may be used by the network to determine whether to select the UE to perform the federated learning task.

In an embodiment, the UE may determine first auxiliary information to be reported according to its own capability information and/or its own idle resource information.

For example, when the UE determines it has an ability to participate in performing a task and/or has idle resources, the UE may report the first auxiliary information indicating the UE can or agrees to perform the task.

For another example, when the UE determines it does not have the ability to perform the task or does not have idle resources, the UE may report the first auxiliary information indicating the UE cannot or rejects to participate in performing the task.

In some cases, the UE may have a strong capability, but the UE is processing an offline task through a part of resources. For example, when a stand-alone game is playing, the remaining idle resources are limited, and if the UE participates, the response speed of the UE may be seriously affected. Then, indication information indicating the UE cannot or rejects to participate in performing the task may be reported in the first auxiliary information.

For another example, the first auxiliary information may also be capability information and/or idle resource information of the UE. The capability information may indicate the capability that the UE has. The idle resource information may indicate idle resources in the UE that are currently available, and specifically may include: type information and/or quantity information of idle resources.

In a word, the UE reports the first auxiliary information which may provide reference to the network, so as to select an appropriate UE to perform a task and reduce the selection of inappropriate UEs to perform the task. The selection of inappropriate UEs may cause a delay on performing the task on one hand and a slow response speed of performing various tasks of the UE itself on the other hand. Thus, the UE improves its speed of performing a task and/or ensures its running speed of other tasks of the UE itself, through the reporting of the first auxiliary information.

In an embodiment, the UE may report the first auxiliary information periodically or based on a trigger event.

The trigger event includes but is not limited to: a reporting indication sent/issued by the network. The reporting indication includes but is not limited to a reporting indication broadcast by the network, for example, a report indication that is broadcast by the network and is received in a paging slot of the UE.

As shown in FIG. 3, the method also includes the following step at S100.

At S100, a paging message for paging the UE in the non-connected state is received. The paging message carries a paging reason. The paging reason includes: a federated learning task to be performed.

In an embodiment, the specific content of the paging reason may be: identification information of the task. For example, the identification information includes but not limited to: identification information of the federated learning task to be performed.

If the paging message carries the identification information of the task, it may be considered that the UE has the task to be performed.

In another embodiment, when the paging reason indicates the task to be performed, the specific content carried in a field corresponding to the paging reason may be: a paging code of the task, and the paging code may be a paging code such as different voice calls. For example, if the task to be performed is federated learning or neural network training, the paging code may be identification information of the federated learning, or training identification of the neural network training.

In the embodiment of the disclosure, the reporting indication of the task to be performed is received through the paging message, without additionally introducing a new signaling to trigger the UE in the non-connected state and report the first auxiliary information, which has the advantages of simple implementation and strong compatibility features.

The paging message may carry a paging identifier of the UE being paged. In this way, after the UE receives the paging message, the UE determines whether the network instructs the UE itself to report the first auxiliary information.

In some embodiments, the step at S110 may include: in response to the paging message, initiating a call request carrying the first auxiliary information.

In an embodiment, after receiving the paging message that is used to page the UE itself, the UE may definitely initiate a call, regardless of the type of paging reason (for example, a voice access or a task to be performed).

In an embodiment, after receiving the paging message, the UE may report the first auxiliary information by reporting a call request if the UE determines to report the first auxiliary information, the UE may also reject to report the first auxiliary information if the UE determines not to report the first auxiliary information. For example, the UE may not report the first auxiliary information when the UE determines that it does not participate in federated learning, and the UE may report its own idle resource information and/or its own capability information when the UE determines to participate in federated learning, so that the network may determine a task volume of the task allocated to the UE and/or a timing of performing a task.

In some embodiments, the call request includes: a call establishment reason, and the call establishment reason can carry the first auxiliary information.

In an embodiment, a new field may be introduced in the call request to carry the first auxiliary information. The new field includes one or more bits.

In the embodiment of the disclosure, the call establishment reason originally included in the call request is used to carry the first auxiliary information, which has the advantages of simple implementation, little change to information format of the call request, and strong compatibility with the related art.

In some embodiments, the step at S110 may include: reporting the received paging message by an access stratum (AS) of the UE to a non-access stratum (NAS) of the UE; determining by the NAS, whether to accept a federated learning task based on second auxiliary information to obtain a determination result; and initiating by the AS, the call request carrying the first auxiliary information based on the determination result obtained from the NAS The UE may be divided into the AS and the NAS, and the NAS is a high layer of the AS.

In the embodiment of the disclosure, after receiving the paging message, the AS may report the paging message to the NAS. In this way, the NAS may determine whether to accept the task based on the second auxiliary information, to obtain a determination result.

In the embodiment of the disclosure, after obtaining the determination result, the NAS may return the determination result to the AS, so that the AS may send the call request carrying the first auxiliary information based on the determination result.

The first auxiliary information in the call request directly or indirectly carries an indication of the determination result.

After sending the call request, the network receives the call request, which means that the network receives the first auxiliary information.

The call request is used to send the first auxiliary information. If performing the task needs the UE to switch to the connected state, the network may also respond to the call request and send a call response that triggers the UE to exit the non-connected state and switch to the connected state, so as to better perform the task, e.g., perform a federated learning task, a neural network training task or a distributed computing task.

In some embodiments, the step at S110 may include: after receiving the paging message, determining by the AS of the UE whether to accept the task based on the second auxiliary information obtained from the NAS of the UE to obtain a determination result; and sending by the AS of the UE, the call request carrying the first auxiliary information based on the determination result.

In some embodiments, the determination of whether the UE accepts the task may also be performed by the AS of the terminal. However, the second auxiliary information for determination is generally stored in the NAS. At this time, the NAS may send the second auxiliary information to the AS. In this way, once the AS receives the paging message, the AS may quickly determine based on the second auxiliary information, so as to speed up the determination of the first auxiliary information and thus speed up the reporting of first auxiliary information.

In some embodiments, the second auxiliary information includes at least one of:

preference information, indicating a preference of tasks accepted by the UE;

historical task acceptance state information, indicating acceptance states of the UE for historical tasks;

network environment information for the UE to determine whether a current network condition meets a network transmission condition for performing the task; and computing power resource information for the UE to determine whether there are sufficient computing power resources for performing the task.

In an embodiment, the preference information may be set by users and be collected by the UE on a human-computer interaction interface, or the preference information may be determined based on a feedback of user confirmation or cancellation when there is a dialog box for a task to be performed in the UE.

In another embodiment, the preference information may also be determined based on a frequency of the UE accepting or rejecting the task. For example, if the frequency of the UE accepting the task is higher than the frequency of rejecting the task, the content indicated by the UE preference information is: the UE prefers to accept the task. If the frequency of the UE accepting the task is not higher than the frequency of rejecting the task, the content indicated by the UE preference information may be considered as: the UE prefers to reject the task.

For example, the acceptance states include at least one of: a number of times of accepting the task; a frequency of accepting the task; a number of successfully performing the task; a number of failures of performing the task; a task volume of accepting the task each time; and an evaluation result of performing the task.

In some cases, the process of performing the task involves in data transmission of a large amount or a small amount. For example, it is necessary to report a result of performing the task and/or parameter data of performing the task. If the network transmission environment of the UE is poor at this time, it may obviously make the execution of the task abnormal. For example, when the UE is located in an area of blocking network signals, the task cannot be performed well if the UE still accepts the task. Therefore, the UE may determine, based on the network environment information, whether the current network condition meets the network transmission condition needed for performing the task.

For example, the UE performs cell signal measurement, and determines the current network condition based on a result of the cell signal measurement.

The result of the cell signal measurement includes: a signal strength of the cell signal and/or a quality of the cell signal. For example, the result of the cell signal measurement includes but not limited to: a reference signal received power (RSRP) or a reference signal receiving quality (RSRQ) or a signal to interference plus noise ratio (SINR).

When the result of the cell signal measurement is greater than a threshold value corresponding to the task, it may be considered that the current network condition meets the network transmission condition for performing the task. When the result of the cell signal measurement is not greater than a threshold value corresponding to the task, it may be considered that the current network condition does not meet the network transmission condition for performing the task.

The computing resources may include: processor resources and/or storage resources. The processor resources may be used for calculation, and specifically may include: a central processing unit and/or an image processor. The storage resources may include: memory resources and/or hard disk resources.

The computing power resource information may be used by the UE to determine whether currently available idle resources perform the federated learning task. When there are sufficient idle resources to perform the task, the first auxiliary information may directly or indirectly indicate that the UE can or agrees to perform the task. When there are no sufficient idle resources to perform the task, the first auxiliary information may directly or indirectly indicate that the UE cannot or rejects to perform the task.

In some embodiments, the second auxiliary information and strategy information are jointly used to determine whether to accept the task.

The second auxiliary information is any information for the UE (AS or NAS) to determine whether to accept the task. The strategy information may be: a determination basis for the UE to determine whether it can or agrees to perform the task with respect to the second auxiliary information.

In an embodiment, the strategy information may be pre-stored in the UE. For example, the strategy information may be written in a communication protocol or pre-stored in configuration information of the UE.

In another embodiment, the method also includes: receiving the strategy information from an AS of the network; or receiving the strategy information from an NAS of the network.

The AS of the network includes: an access network on the network.

The NAS of the network includes: a core network on the network.

That is, the strategy information used by the UE to determine whether to perform the task may be sent by the access network or the core network.

In some embodiments, the strategy information includes at least one of: a computing resource threshold, indicating a minimum amount of computing resources to accept the task; and a network signal quality threshold, indicating a minimum wireless signal quality to accept the task.

The computing power resource threshold may include: a computing power resource quantity threshold.

The network signal quality threshold includes but not limited to: an RSRP threshold and/or an RSRQ threshold.

In some embodiments, the step at S110 may include: in response to the paging message and determining to accept the task, initiating the call request with the call establishment reason being performing the task; and/or, in response to the paging message and determining to reject the task, initiating the call request with the call establishment reason being abnormal paging.

In the embodiment of the disclosure, if the UE can or agrees to perform the task, the first auxiliary information may be indication information of performing the task, so the call establishment reason is to perform the task.

In the embodiment of the disclosure, if the UE cannot or is rejected to perform the task, the first auxiliary information may be indication information of rejecting to perform the task, so the call establishment reason may be abnormal paging.

If the UE is in an inactive state, the network after receiving the call request, may determine whether to select the UE to perform the task based on the first auxiliary information carried in the paging reason.

In another embodiment, the non-connected state of the UE is the idle state, and the paging message is a paging message sent by the core network.

The call request includes: an RRC connection establishment request sent by the UE in the idle state.

At this time, the call request may be the request that the UE calls for the network to establish the RRC connection. After the request is sent, the UE may perform a subsequent procedure of establishing the RRC connection with the network.

If the paging reason is to perform a task, the network has a very high probability of selecting the UE to perform the task, and the network may respond to the RRC connection establishment request, establish the RRC connection with the UE, and transmit various data for performing the task through the RRC connection.

In another embodiment, when the network may send the paging message carrying the task to be performed to multiple UEs, some of the UEs may be selected to perform the task. Therefore, even if the UE reports the first auxiliary information that the UE can or agrees to perform the task, it is possible not to select the UE as a UE for performing the task. That is, the RRC connection establishment request sent by the UE may still be rejected by the network.

In an embodiment, as shown in FIG. 4A, the method further includes the following steps at S121A to S122A.

At S121A, an RRC connection release message is received. The RRC connection release message is sent based on an RRC connection establishment request carrying abnormal paging;

At S122A, the idle state is kept based on the RRC connection release message.

If the call establishment reason in the call request sent by the UE is abnormal paging, it means that the UE itself is not suitable to perform the task at present, and if forcing the UE to perform the task may lead to abnormal execution of the task and/or abnormal execution of other tasks of the UE. In order to avoid this situation, the network may send an RRC connection release message, for triggering the UE to suspend the execution of the RRC connection establishment process, and keeping the UE in an idle state with low power consumption, which reduces unnecessary execution of the RRC connection establishment operation or reduces the duration of keeping the UE in the idle state with low power consumption.

In some embodiments, the non-connected state of the UE is an inactive state. The call request includes an RRC resume request sent by the UE in the inactive state.

If the UE is in the inactive state, the call request is the RRC resume request, that is, the RRC resume request carries the first auxiliary information.

In a word, in the embodiment of the disclosure, the processes of responding to the paging message of the UE in different states are fully utilized to carry the first auxiliary information, which has the advantages of strong compatibility with the related art and easy implementation.

In some embodiments, as shown in FIG. 4B, the method further includes the following steps at S121B to S122B.

At S121B, an RRC resume response message is received.

At S122B, in response to the RRC resume response message being sent based on the RRC resume request carrying abnormal paging, keeping the inactive state.

If the first auxiliary information carried in the RRC resume request indicates that the UE cannot or rejects to perform the task, the network may not force the UE to perform various tasks generally. Therefore, the RRC resume request carrying abnormal paging may cause the UE to receive the RRC resume response message indicating that the UE keeps the inactive state.

If the UE receives the RRC resume response message indicating that the UE keeps the inactive state, the UE may be kept in the inactive state, so that the UE may not exit the inactive state and switch to the connected state due to a need to perform tasks, thus reducing the UE power consumption as much as possible.

As shown in FIG. 5, an embodiment of the disclosure provides a method for wireless communication, which is applied to a base station. The method includes the following step at S210.

At S210, first auxiliary information reported by a UE in a non-connected state is received. The first auxiliary information is configured for a network to determine a UE for performing a task.

The method for wireless communication is applied to a base station, and the base station may be used as a component of an access network on the network, that is, an AS of the network.

In a case, after the base station receives the first auxiliary information, the base station may determine whether the UE is selected as a UE for performing a task based on the first auxiliary information.

In another case, the base station after receiving the first auxiliary information session, may further report the first auxiliary information to the core network, and the first auxiliary information reported to the core network may be used by the core network to select UEs to perform tasks.

Figure 6:
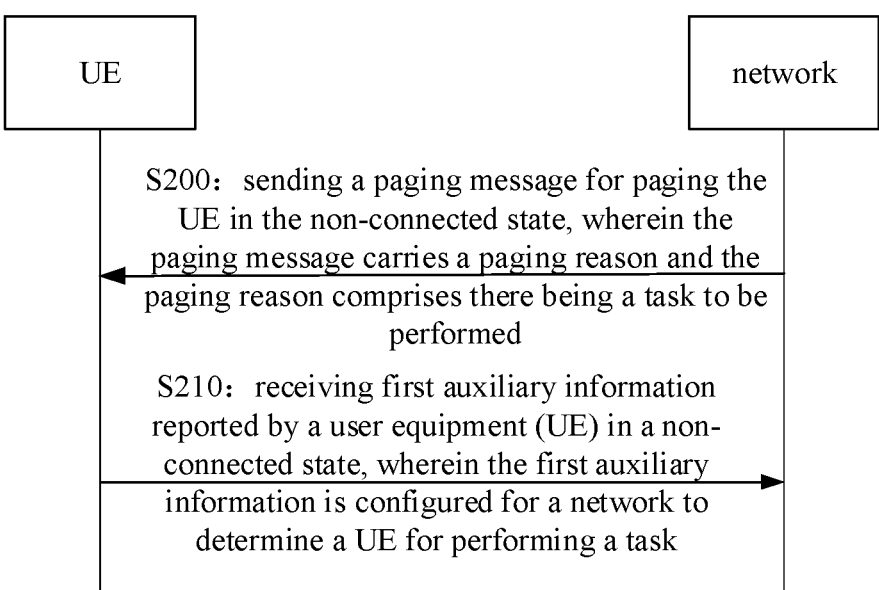
FIG. 6 is a schematic flowchart illustrating a method for wireless communication according to an exemplary embodiment.

In an embodiment, as shown in FIG. 6, the method further includes the following step at S200.

At S200, a paging message for paging the UE in the non-connected state is sent. The paging message carries a paging reason and the paging reason includes there being a task to be performed.

The paging message may include two types, one of which is a paging message sent by the core network and the base station passes through the paging message, the other of which is a radio access network (RAN) paging message formed by an access network (i.e., a base station).

No matter which type of paging message may carry the paging reason, and the paging reason includes the task to be performed, which means that the UE is informed that the reason for this paging is due to the task to be performed by the UE, and the UE may be triggered to report the first auxiliary information.

In an embodiment, the first auxiliary information is carried in a call request triggered by the paging message.

For example, the method also includes: in response to the call request carrying a call establishment reason indicating that the task is determined to be accepted, determining that the UE can serve as the UE for performing the task; and/or, in response to the call request carrying a call establishment reason of abnormal paging, determining that the UE cannot serve as the UE for performing the task.

In an embodiment, if the call establishment reason carried in the call request indicates that the task is determined to be accepted, the network may directly select the UE as the UE performing the task. The direct selection of the UE by the network as the UE performing the task may include: selecting by the access network, the UE as the UE performing the task, or notifying by the access network, the content indicated by the call establishment reason to the core network and directly selecting by the access network, the UE as the UE performing the task.

In an embodiment, if the call establishment reason carried in the call request indicates that the task is determined to be accepted, the network determines that the UE can serve as the UE for performing the task. Specifically, whether the UE is selected as the UE performing the task may include: obtaining a comparison result by comparing the capability information and/or idle resource information of different UEs, and selecting the UE as a UE for performing a task based on the comparison result.

In an embodiment, if the call establishment reason carried in the call request indicates that the paging is abnormal, the network may directly not select the UE as the UE performing the task. Directly not selecting by the network, the UE as the UE performing the task may include: not selecting the UE as the UE performing the task by the access network, or notifying by the access network, the content indicated by the call establishment reason to the core network, and not selecting the UE as the UE performing the task by the core network.

In an embodiment, the method also includes:

in response to the paging message being sent by a core network, sending a paging response message to the core network based on the call establishment reason carried in the call request, in which the paging response message includes: a response success result when the call establishment reason is that the task is determined to be accepted, or a response failure result when the call establishment reason is abnormal paging.

If the UE is in the idle state of the non-connected state, the paging message is sent by the core network. In this way, the access network receives the call request returned based on the paging message, and sends a paging response message to the core network, based on the call establishment reason carried in the call request. As such, the core network knows whether the current UE is successfully paged, and determines whether the paged UE may be used as a UE participating in the task execution.

In some embodiments, the method also includes: sending strategy information. The strategy information is configured for the UE to determine the reported first auxiliary information.

The access network will also send the strategy information. The strategy information may include one or more strategy entries, each of which may be used by the UE to generate the first auxiliary information that needs to be reported.

For information content of the strategy information, reference may be made to the foregoing embodiments in detail, which will not be repeated here.

For example, the strategy information may include: a computing power resource threshold and/or a network signal quality threshold.

Figure 7:
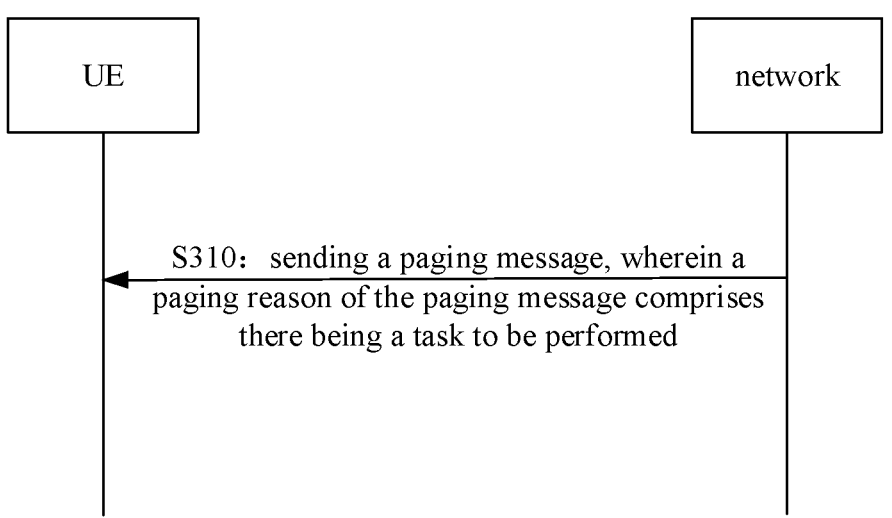
FIG. 7 is a schematic flowchart illustrating a method for wireless communication according to an exemplary embodiment.

As shown in FIG. 7, an embodiment of the disclosure provides a method for wireless communication. The method includes the following step at S310.

At S310, a paging message is sent. A paging reason of the paging message includes: there being a task to be performed.

The method for wireless communication may be applied to an access network or a core network, that is, the method for wireless communication may be applied to an AS of a network or an NAS of the network.

The task to be performed here includes but is not limited to the aforementioned federated learning task, neural network training task, machine learning task, and/or distributed computing task.

In some embodiments, the method also includes:

in response to the method being applicable to an access network, receiving a call request returned based on the paging message, in which a call establishment reason of the call request carries first auxiliary information, the first auxiliary information includes: It is used for the network to determine the UE performing the task.

If the method is applicable to the access network, the paging message may include: an RRC resume request and/or an RRC connection establishment request. The first auxiliary information is carried in the call establishment reason of the RRC resume request or the RRC connection establishment request.

The content indicated by the first auxiliary information includes but is not limited to: a determination of accepting to perform the task, and abnormal paging.

In some embodiments, the method also includes:

in response to the method being applicable to a core network, receiving a paging response message returned based on the paging message from the access network, in which the paging response message is generated based on the first auxiliary information carried by the call establishment reason in the call request, the call request being triggered by the paging message;

The paging response message includes: a response success result when the call establishment reason is that the task is determined to be accepted, or a response failure result when the call establishment reason is abnormal paging.

If the method is applicable to the core network, the core network sends the paging message to the UE through the access network, so that the core network receives the paging response message returned based on the paging message through the access network.

The paging response message is generated based on the first auxiliary information in the call request. The call request is returned by the UE based on a trigger of the paging message.

If the first auxiliary information indicates that performing the task is determined to accept, the paging response message received from the access network is a paging success response message, and the paging response message carries a successful response result. If the first auxiliary information indicates abnormal paging, the paging response message received from the access network is a paging failure message, and the paging response message carries a response failure result.

At this time, the core network may determine whether to select the UE as a UE performing a task based on the paging response message.

Figures 8, 9:
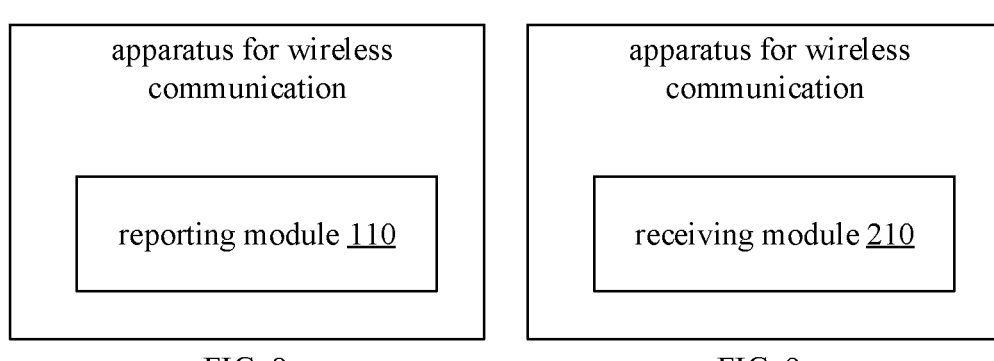
FIG. 8 is a structural schematic diagram illustrating an apparatus for wireless communication as applied to a UE, according to an exemplary embodiment.
FIG. 9 is a structural schematic diagram illustrating an apparatus for wireless communication as applied to a base station, according to an exemplary embodiment.

As shown in FIG. 8, an embodiment of the disclosure provides an apparatus for wireless communication, which is applied to a user equipment (UE). The apparatus includes a reporting module 110, configured to report by the UE in a non-connected state, first auxiliary information. The first auxiliary information is configured for a network to determine a UE for performing a task.

The task here may be any task that the network needs the UE to assist or share, including but not limited to the aforementioned federated learning task, neural network training task, or distributed computing task.

In an embodiment, the reporting module 110 may be a program module. After the program module is executed by a processor, the reporting module may realize reporting the first auxiliary information of the UE in the non-connected state.

In another embodiment, the reporting module 110 may be a combination of hardware and software, which includes, but is not limited to: a programmable array. The programmable array includes, but is not limited to: a complex programmable array and/or a field programmable array.

In yet another embodiment, the reporting module 110 may be a pure hardware module that includes but is not limited to: an application specific integrated circuit.

In an embodiment, the apparatus also includes: a first receiving module, configured to receive a paging message for paging the UE in the non-connected state. The paging message carries a paging reason and the paging reason includes there being a task to be performed.

In some embodiments, the reporting module 110 is configured to initiate a call request carrying the first auxiliary information in response to the paging message.

In some embodiments, the call request includes a call establishment reason, and the call establishment reason can carry the first auxiliary information.

In some embodiments, the reporting module 110 is configured to report the received paging message by an access stratum (AS) of the UE to a non-access stratum (NAS) of the UE; determine by the NAS, whether to accept the task based on second auxiliary information and obtaining a determination result; and initiate by the AS, the call request carrying the first auxiliary information based on the determination result obtained from the NAS.

In some embodiments, the reporting module 110 is configured to after receiving the paging message, determine by an access stratum (AS) of the UE, whether to accept the task based on the second auxiliary information obtained from a non-access stratum (NAS) of the UE and obtaining a determination result; and send by the AS of the UE, the call request carrying the first auxiliary information based on the determination result.

In some embodiments, the second auxiliary information includes at least one of: preference information indicating a preference of tasks accepted by the UE; historical task acceptance state information, indicating acceptance states of the UE for historical tasks; network environment information for the UE to determine whether a current network condition meets a network transmission condition for performing the task; and computing power resource information for the UE to determine whether there are sufficient computing power resources for performing the task.

In some embodiments, the second auxiliary information and strategy information are jointly used to determine whether to accept the task.

In some embodiments, the apparatus also includes: a strategy module, configured to receive the strategy information from AS of the network; or receive the strategy information from NAS of the network.

In some embodiments, the strategy information includes at least one of: a computing resource threshold, indicating a minimum amount of computing resources to accept the task; and a network signal quality threshold, indicating a minimum wireless signal quality to accept the task.

In some embodiments, the reporting module 110 is configured to: in response to the paging message and determining to accept the task, initiate the call request with the call establishment reason being performing the task; or in response to the paging message and determining to reject the task, initiate the call request with the call establishment reason being abnormal paging.

In some embodiments, the non-connected state includes an idle state, and the call request includes an RRC connection establishment request sent by the UE in the idle state.

In some embodiments, the apparatus also includes: an idle state processing module, configured to receive an RRC connection release message, in which the RRC connection release message is sent based on the RRC connection establishment request carrying abnormal paging; and keep the idle state based on the RRC connection release message.

In an embodiment, the non-connected state includes an inactive state, and the call request includes: an RRC resume request sent by the UE in the inactive state.

In an embodiment, the apparatus also includes: an inactive state processing module, configured to receive an RRC resume response message; and keep the inactive state in response to the RRC resume response message being sent based on the RRC resume request carrying a abnormal paging.

As shown in FIG. 9, an embodiment of the disclosure provides an apparatus for wireless communication, which is applied to a base station. The apparatus includes: a receiving module 210, configured to receive first auxiliary information reported by a UE in a non-connected state, where the first auxiliary information is configured for the network to determine a UE for performing a task.

In an embodiment, the receiving module 210 may be a program module. After the program module is executed by a processor, the receiving module may receive the first auxiliary information reported by the UE in the non-connected state.

In another embodiment, the receiving module 210 may be a combination of hardware and software, which includes but is not limited to: a programmable array. The programmable array includes, but is not limited to: a complex programmable array and/or a field programmable array.

In yet another embodiment, the receiving module 210 may be a pure hardware module that includes but is not limited to: an application specific integrated circuit.

In an embodiment, the apparatus also includes: a paging module, configured to send a paging message for paging the UE in the non-connected state, in which the paging message carries a paging reason and the paging reason includes there being a task to be performed.

In an embodiment, the first auxiliary information is carried in a call request triggered by the paging message.

In an embodiment, the apparatus also includes: a first response module, configured to in response to the call request carrying a call establishment reason indicating that the task is determined to be accepted, determine that the UE can serve as the UE for performing the task; or in response to the call request carrying a call establishment reason of abnormal paging, determine that the UE cannot serve as the UE for performing the task.

In an embodiment, the apparatus also includes: a second response module, configured to in response to the paging message being sent by a core network, send a paging response message to the core network based on the call establishment reason carried in the call request. The paging response message includes: a response success result when the call establishment reason is that the task is determined to be accepted, or a response failure result when the call establishment reason is abnormal paging.

In an embodiment, the apparatus also includes: a strategy module, configured to send strategy information. The strategy information is configured for the UE to determine the reported first auxiliary information.

Figures 10, 11:
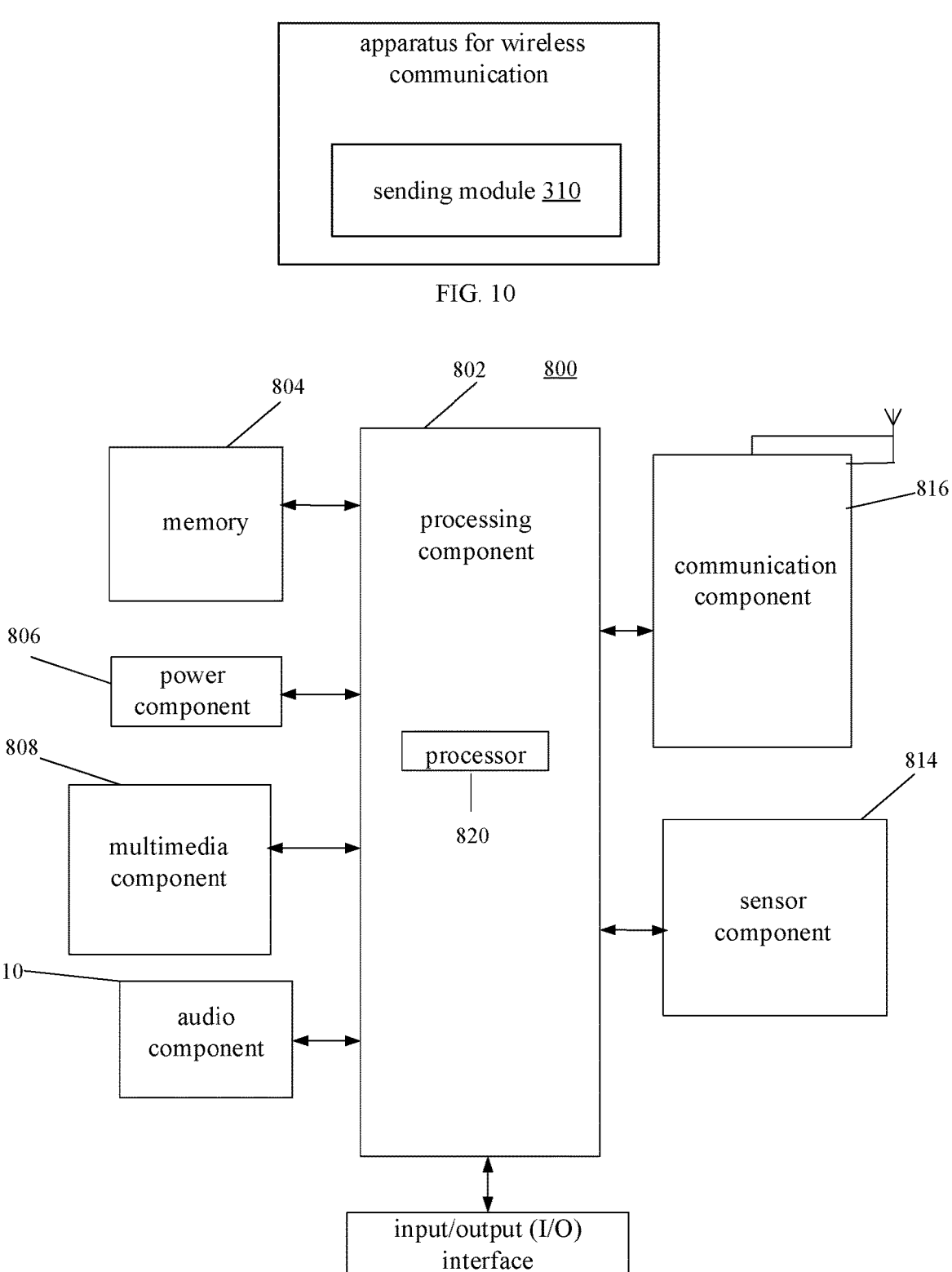
FIG. 10 is a structural schematic diagram illustrating an apparatus for wireless communication according to an exemplary embodiment.
FIG. 11 is a structural schematic diagram illustrating a user equipment (UE) according to an exemplary embodiment.

As shown in FIG. 10, an embodiment of the disclosure relates to a apparatus for wireless communication. The apparatus includes: a sending module 310, configured to send a paging message. A paging reason of the paging message includes: there being a task to be performed.

In an embodiment, the sending module may be a program module. After the program module is executed by the processor, the sending module may realize sending the paging message with a paging reason that there is a task to be performed.

In another embodiment, the paging module may be a combination of hardware and software, which includes but is not limited to: a programmable array. The programmable array includes, but is not limited to: a complex programmable array and/or a field programmable array.

In yet another embodiment, the paging module may be a pure hardware module that includes but is not limited to: an application specific integrated circuit.

In an embodiment, the apparatus also includes: a call request access module, configured to in response to the method being applicable to an access network, receive a call request returned based on the paging message. A call establishment reason of the call request carries first auxiliary information, and the first auxiliary information is configured for a network to determine a UE for performing a task.

In an embodiment, the apparatus also includes: a paging response module configured to in response to the method being applicable to a core network, receive a paging response message returned based on the paging message from the access network. The paging response message is generated based on the first auxiliary information carried by the call establishment reason in the call request, the call request being triggered by the paging message.

The paging response message includes: a response success result when the call establishment reason is that the task is determined to be accepted, or a response failure result when the call establishment reason is abnormal paging.

The UE in the disconnected state notifies the first auxiliary information as a reference for the base station to select UEs suitable for performing federated learning in the network.

The trigger for the UE in the non-connected state notifying the first auxiliary information, may be a network-based paging message.

As an embodiment, the paging message of the network is a paging message of the core network, which carries a paging reason that is federated learning (i.e., a federated learning task to be performed).

In another embodiment, the AS of the UE in the non-connected state after receiving the paging message from the network, notifies the paging message to the NAS of the UE.

As an embodiment, the NAS of the UE makes a determination on whether to accept the federated learning task initiated by the network, and notifies the call establishment reason to the AS. The AS initiates an RRC connection establishment request/an RRC resume request after receiving the notification.

As an embodiment, the AS makes a determination on whether to accept the federated learning task initiated by the network, and notifies a call establishment reason to initiate an RRC connection establishment request/an RRC resume request. At this time, the AS may obtain some auxiliary information from the NAS across the layer, such as preference information of the UE.

In an embodiment, the UE determines a user selection on whether it is appropriate to perform the federated learning based on the auxiliary information of the network.

As an embodiment, the auxiliary information of the network may be the strategy information notified to the UE by the base station (AS) and the core network element (NAS), for example, the computing power threshold and the RSRP threshold provided by the base station.

As an embodiment, the terminal may also determine according to the UE preference information, and this function is usually at the NAS.

In an embodiment, for a received response to the paging message, the UE may initiate an RRC connection establishment request/an RRC resume request to inform the network of a user selection on whether the current UE is suitable for federated learning.

As an embodiment, a new call establishment reason is federated learning.

As an embodiment, the new call establishment reason is an abnormality, such as a paging abnormality caused by being unsuitable for federated learning. In an embodiment, the network determines subsequent actions based on the call establishment reason of UE. For example, when the new call establishment reason is abnormal paging, the network directly initiates an RRC connection release to the terminal.

For another example, when the new call establishment reason is abnormal paging, the network responds a paging failure response message to the core network.

An embodiment of the disclosure provides a communication device, including a processor, a transceiver, a memory, and an executable program stored on the memory and capable of being run by the processor. When the executable program is executed by the processor, the method for wireless communication according to any technical solution aforementioned is implemented.

The memory may include various types of storage media, which are non-transitory computer storage media, and may continue to memorize and store information stored on the memory after the communication device is powered off. The communication device includes a base station, or a terminal, or a network element of a core network.

The processor may be connected to the memory through a bus, etc., for reading the executable program stored on the memory, so that for example, at least one of the methods shown in FIG. 2, FIG. 3, FIG. 4A, FIG. 4B and FIG. 7 is implemented.

An embodiment of the disclosure provides a computer storage medium, the computer storage medium stores an executable program. When the executable program is executed by the processor, the method shown in any technical solution of the first aspect or the second aspect may be implemented, for example, at least one of the methods shown in FIG. 2, FIG. 3 , FIG. 4A, FIG. 4B and FIG. 7.

FIG. 11 is a block diagram of user equipment (UE) 800 according to an exemplary embodiment. For example, the UE 800 may be a mobile phone, a computer, a digital broadcast terminal, a messaging device, a game console, a tablet device, a medical device, a fitness device, a personal digital assistant, or the like.

Referring to FIG. 11, the UE 800 may include one or more of the following components: a processing component 802, a memory 804, a power component 806, a multimedia component 808, an audio component 810, an input/output (I/O) interface 812, a sensor component 814, and a communication component 816.

The processing component 802 generally controls overall operations of the UE 800, such as the operations associated with display, phone calls, data communications, camera operations, and recording operations. The processing component 802 may include one or more processors 820 to execute instructions to perform all or some of the steps of the methods described above. Moreover, the processing component 802 may include one or more modules that facilitate interactions between the processing component 802 and other components. For example, the processing component 802 may include a multimedia module to facilitate interactions between the multimedia component 808 and the processing component 802.

The memory 804 is configured to store various types of data to support operation of the UE 800. Examples of such data include instructions for any application or method operating on the UE 800, contact data, phonebook data, messages, pictures, videos, and the like. The memory 804 may be implemented by any type of volatile or nonvolatile storage device or their combination, such as a static random-access memory (SRAM), an electrically-erasable programmable read only memory (EEPROM), an erasable programmable read only memory (EPROM), a programmable read only memory (PROM), a read only memory (ROM), a magnetic memory, a flash memory, a magnetic or optical disk.

The power component 806 provides power to various components of the UE 800. The power component 806 may include a power management system, one or more power sources, and any other components associated with the generation, management, and distribution of power in the UE 800.

The multimedia component 808 includes a screen providing an output interface between the UE 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 808 includes a front-facing camera and/or a rear-facing camera. When the UE 800 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 810 is configured to output and/or input audio signals. For example, the audio component 810 includes a microphone (MIC for short) that is configured to receive external audio signals when the UE 800 is in an operating mode, such as a call mode, a recording mode, and a voice recognition mode. The received audio signal may be further stored in the memory 804 or transmitted via the communication component 816. In some embodiments, the audio component 810 also includes a speaker for outputting audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the UE 800. For instance, the sensor component 814 may detect an open/closed status of the UE 800, relative positioning of components, e.g., the display and the keypad, of the UE 800, a change in position of the UE 800 or a component of the UE 800, a presence or absence of user contact with the UE 800, an orientation or an acceleration/deceleration of the UE 800, and a change in temperature of the UE 800. The sensor component 814 may include a proximity sensor configured to detect the presence of nearby objects without any physical contact. The sensor component 814 may also include a light sensor, such as a complementary metal oxide semiconductor (CMOS) or a charge-coupled device (CCD) image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the UE 800 and other devices. The UE 800 can access a wireless network based on a communication standard, such as WiFi, 2G, or 3G, or their combination. In an exemplary embodiment, the communication component 816 receives a broadcast signal or broadcast associated information from an external broadcast management system via a broadcast channel. In an exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In exemplary embodiments, the UE 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In exemplary embodiments, there is also provided a non-transitory computer readable storage medium including instructions, such as included in the memory 804, executable by the processor 820 in the UE 800, for performing the above method. For example, the non-transitory computer readable storage medium may be a ROM, a random access memory (RAM), a CD-ROM, a magnetic tape, a floppy disc, an optical data storage device, and the like.

Figure 12:
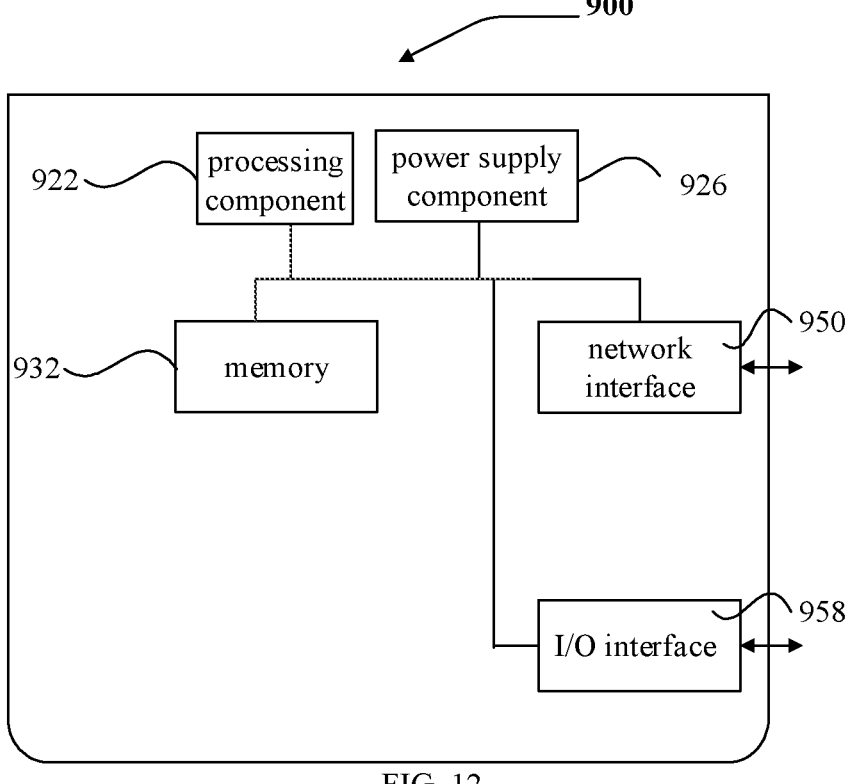
FIG. 12 is a structural schematic diagram illustrating a network element according to an exemplary embodiment.

As shown in FIG. 12, an embodiment of the disclosure shows a structure of a base station or a network element of a core network. For example, the network element 900 may be provided as a network device. Referring to FIG. 12, the network element 900 includes a processing component 922, which further includes one or more processors, and memory resources represented by a memory 932 for storing instructions executable by the processing component 922, such as application programs. The application program stored in the memory 932 may include one or more modules, each of which corresponding to a set of instructions. In addition, the processing component 922 is configured to execute instructions to perform any of the aforementioned methods applied to the base station, for example, the methods shown in FIG. 2, FIG. 3, FIG. 4A, FIG. 4B and FIG. 7.

The network element 900 may also include a power supply component 926 configured to perform power management of the network element 900, a wired or wireless network interface 950 configured to connect the network element 900 to a network, and an input output (I/O) interface 958. The network element 900 may operate an operating system stored in the memory 932, such as Windows Server™, Mac OS X™, Unix™, Linux™ FreeBSD™ or the like.

The network element may be a network element of an access network, for example, a base station.

The network element may also be a network element of the core network, for example, an access and mobility management function (AMF) of the core network.

Those skilled in the art will be aware of other implementations of the disclosure after considering the specification and practicing the disclosure disclosed herein. The disclosure is intended to cover any variations, uses, or adaptive changes of the disclosure, which follow the general principles of the disclosure and include common knowledge or conventional technical means in the technical field not disclosed herein. The description and the embodiments are to be regarded as exemplary, and the true scope and spirit of the disclosure are indicated in the following claims.

It should be understood that the disclosure is not limited to the precise structures described above and illustrated in the accompanying drawings, and that various modifications and changes may be made without departing from its scope. The scope of the disclosure is limited only by the appended claims.

What is claimed is:

1. A method for wireless communication, performed by a user equipment (UE), the method comprising:

receiving a paging message for paging the UE in a non-connected state; and in response to the paging message, initiating a call request carrying first auxiliary information;

wherein in response to the paging message, initiating the call request carrying the first auxiliary information comprises:

in response to the paging message, initiating the call request with a call establishment reason being abnormal paging.

2. The method of claim 1, wherein the paging message carries:

a paging reason; and a paging identifier of the UE being paged, enabling the UE to determine whether a network instructs the UE to report the first auxiliary information after receiving the paging message.

3. The method of claim 2, wherein the first auxiliary information indicates one of:

determining to accept a task; and the abnormal paging.

4. The method of claim 1, wherein a new field introduced in the call request carries the first auxiliary information.

5. The method of claim 1, wherein in response to the paging message, initiating the call request carrying the first auxiliary information comprises:

reporting the received paging message by an access stratum (AS) of the UE to a non-access stratum (NAS) of the UE; determining by the NAS, whether to accept the task based on second auxiliary information and obtaining a determination result; and initiating by the AS, the call request carrying the first auxiliary information based on the determination result obtained from the NAS.

6. The method of claim 1, wherein in response to the paging message, initiating the call request carrying the first auxiliary information comprises:

in response to receiving the paging message and determining to report the first auxiliary information, reporting the first auxiliary information by the call request; or in response to receiving the paging message and determining not to report the first auxiliary information, rejecting reporting of the first auxiliary information.

7. The method of claim 1, wherein the non-connected state comprises an idle state, and the call request comprises a radio resource control (RRC) connection establishment request sent by the UE in the idle state; or wherein the non-connected state comprises an inactive state, and the call request comprises an RRC resume request sent by the UE in the inactive state.

8. The method of claim 7, further comprising:

receiving an RRC connection release message, wherein the RRC connection release message is sent based on the RRC connection establishment request carrying abnormal paging; and keeping the idle state based on the RRC connection release message; or receiving an RRC resume response message; and in response to the RRC resume response message being sent based on the RRC resume request carrying abnormal paging, keeping the inactive state.

9. A method for wireless communication, performed by a base station, the method comprising:

sending a paging message for paging a user equipment (UE) in a non-connected state; and receiving first auxiliary information reported by the UE in the non-connected state, wherein the first auxiliary information is carried in a call request triggered by the paging message, wherein the call request carries a call establishment reason indicating abnormal paging.

10. The method of claim 9, wherein the paging message carries:

a paging reason; or a paging identifier of the UE being paged, enabling the UE to determine whether a network instructs the UE to report the first auxiliary information after receiving the paging message.

11. The method of claim 9, further comprising:

in response to the paging message being sent by a core network, sending a paging response message to the core network based on the call establishment reason carried in the call request, wherein the paging response message comprises: a response success result when the call establishment reason is that the task is determined to be accepted, or a response failure result when the call establishment reason is abnormal paging.

12. The method of claim 9, further comprising:

sending strategy information, wherein the strategy information is configured for the UE to determine the reported first auxiliary information.

13. A method for wireless communication, comprising:

sending a paging message; and receiving first auxiliary information reported by a user equipment (UE) in a non-connected state, wherein the first auxiliary information is carried in a call request triggered by the paging message, wherein the call request carries a call establishment reason indicating abnormal paging.

14. The method of claim 13, further comprising:

in response to the method being applicable to an access network, receiving a call request returned based on the paging message, wherein a call establishment reason of the call request carries first auxiliary information, and the first auxiliary information is configured for a network to determine a UE for performing the task; and in response to the method being applicable to a core network, receiving a paging response message returned based on the paging message from the access network, wherein the paging response message is generated based on the first auxiliary information carried by the call establishment reason in the call request, the call request being triggered by the paging message;

wherein the paging response message comprises: a response success result when the call establishment reason is that the task is determined to be accepted, or a response failure result when the call establishment reason is abnormal paging.

* * * * *